United States Patent [19]

Sulzer

[11] Patent Number: 5,692,791
[45] Date of Patent: Dec. 2, 1997

[54] TRUCK BED REMOVABLE RACK SYSTEM

[76] Inventor: Carl R. Sulzer, 84 Bunting Ct., Chillicothe, Ohio 45601

[21] Appl. No.: 779,839

[22] Filed: Jan. 7, 1997

[51] Int. Cl.⁶ .................................................. B60P 3/00
[52] U.S. Cl. ........................................ 296/3; 224/403
[58] Field of Search ............................ 296/3; 224/403, 224/405

[56] References Cited

U.S. PATENT DOCUMENTS

| | | | |
|---|---|---|---|
| 3,475,046 | 10/1969 | Webster | 296/3 |
| 4,509,787 | 4/1985 | Knaack et al. | 296/3 |
| 5,108,141 | 4/1992 | Anderson | 296/3 |
| 5,310,238 | 5/1994 | Wheatley | 296/3 |
| 5,476,301 | 12/1995 | Berkich | 295/3 |

FOREIGN PATENT DOCUMENTS 741980  2/1933  France ......................... 296/3

*Primary Examiner*—Gary C. Hoge

[57] ABSTRACT

A new Truck Bed Removable Rack System for providing a compact, easily assembled and disassembled rack for a bed of a pick-up truck. The inventive device includes a plurality of vertical support poles for projecting within stake apertures of the bed of the pick-up truck, an inner and an outer member secured traversely to a lower portion of the support poles, a pair of elongated members removably secured to the support poles parallel to one another, a plurality of traverse members removably secured mesial the pair of elongated members, a plurality of extended members secured orthogonally to each inner member projecting downward and having a horizontal slot, and an L-member removably projecting within the slot and a threaded shaft threadably engaging the L-member substantially parallel to the support poles. The threaded shaft includes a winged end allowing a user to easily secure the inventive device to the bed of the pick-up truck without damaging the bed.

5 Claims, 3 Drawing Sheets

TRUCK BED REMOVABLE RACK SYSTEM

BACKGROUND OF THE INVENTION

1. Field of the Invention

The present invention relates to Pick-Up Truck Rack Devices and more particularly pertains to a new Truck Bed Removable Rack System for providing a compact, easily assembled and disassembled rack for a bed of a pick-up truck.

2. Description of the Prior Art

The use of Pick-Up Truck Rack Devices is known in the prior art. More specifically, Pick-Up Truck Rack Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Pick-Up Truck Rack Devices include U.S. Pat. No. 4,152,020; U.S. Pat. No. 4,527,827; U.S. Pat. No. 4,600,232; U.S. Pat. No. 5,108,141; U.S. Pat. No. 5,267,820; U.S. Pat. No. 5,310,238; U.S. Pat. No. 5,345,658; U.S. Pat. No. 5,364,150; U.S. Pat. No. 5,423,587; and U.S. Pat. No. 5,443,190.

While these devices fulfill their respective, particular objectives and requirements, the aforementioned patents do not disclose a new Truck Bed Removable Rack System. The inventive device includes a plurality of vertical support poles for projecting within stake apertures of the bed of the pick-up truck, an inner and an outer member secured traversely to a lower portion of the support poles, a pair of elongated members removably secured to the support poles parallel to one another, a plurality of traverse members removably secured mesial the pair of elongated members, a plurality of extended members secured orthogonally to each inner member projecting downward and having a horizontal slot, and an L-member removably projecting within the slot and a threaded shaft threadably engaging the L-member substantially parallel to the support poles.

In these respects, the Truck Bed Removable Rack System according to the present invention substantially departs from the conventional concepts and designs of the prior art, and in so doing provides an apparatus primarily developed for the purpose of providing a compact, easily assembled and disassembled rack for a bed of a pick-up truck.

SUMMARY OF THE INVENTION

In view of the foregoing disadvantages inherent in the known types of Pick-Up Truck Rack Devices now present in the prior art, the present invention provides a new Truck Bed Removable Rack System construction wherein the same can be utilized for providing a compact, easily assembled and disassembled rack for a bed of a pick-up truck.

The general purpose of the present invention, which will be described subsequently in greater detail, is to provide a new Truck Bed Removable Rack System apparatus and method which has many of the advantages of the Pick-Up Truck Rack Devices mentioned heretofore and many novel features that result in a new Truck Bed Removable Rack System which is not anticipated, rendered obvious, suggested, or even implied by any of the prior art Pick-Up Truck Rack Devices, either alone or in any combination thereof.

To attain this, the present invention generally comprises a plurality of vertical support poles for projecting within stake apertures of the bed of the pick-up truck, an inner and an outer member secured traversely to a lower portion of the support poles, a pair of elongated members removably secured to the support poles parallel to one another, a plurality of traverse members removably secured mesial the pair of elongated members, a plurality of extended members secured orthogonally to each inner member projecting downward and having a horizontal slot, and an L-member removably projecting within the slot and a threaded shaft threadably engaging the L-member substantially parallel to the support poles.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Truck Bed Removable Rack System apparatus and method which has many of the advantages of the Pick-Up Truck Rack Devices mentioned heretofore and many novel features that result in a new Truck Bed Removable Rack System which is not anticipated, rendered obvious, suggested, or even implied by any of the prior art Pick-Up Truck Rack Devices, either alone or in any combination thereof.

It is another object of the present invention to provide a new Truck Bed Removable Rack System which may be easily and efficiently manufactured and marketed.

It is a further object of the present invention to provide a new Truck Bed Removable Rack System which is of a durable and reliable construction.

An even further object of the present invention is to provide a new Truck Bed Removable Rack System which is susceptible of a low cost of manufacture with regard to both materials and labor, and which accordingly is then susceptible of low prices of sale to the consuming public, thereby making such Truck Bed Removable Rack System economically available to the buying public.

Still yet another object of the present invention is to provide a new Truck Bed Removable Rack System which provides in the apparatuses and methods of the prior art some of the advantages thereof, while simultaneously overcoming some of the disadvantages normally associated therewith.

Still another object of the present invention is to provide a new Truck Bed Removable Rack System for providing a compact, easily assembled and disassembled rack for a bed of a pick-up truck.

Yet another object of the present invention is to provide a new Truck Bed Removable Rack System which includes a plurality of vertical support poles for projecting within stake apertures of the bed of the pick-up truck, an inner and an outer member secured traversely to a lower portion of the support poles, a pair of elongated members removably secured to the support poles parallel to one another, a plurality of traverse members removably secured mesial the pair of elongated members, a plurality of extended members secured orthogonally to each inner member projecting downward and having a horizontal slot, and an L-member removably projecting within the slot and a threaded shaft threadably engaging the L-member substantially parallel to the support poles.

Still yet another object of the present invention is to provide a new Truck Bed Removable Rack System that does not require any alteration of the bed of the pick-up truck thereby retaining the value of the pick-up truck.

Even still another object of the present invention is to provide a new Truck Bed Removable Rack System that is designed to carry elongated and bulky objects which cannot be easily transported in the bed of the pick-up truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
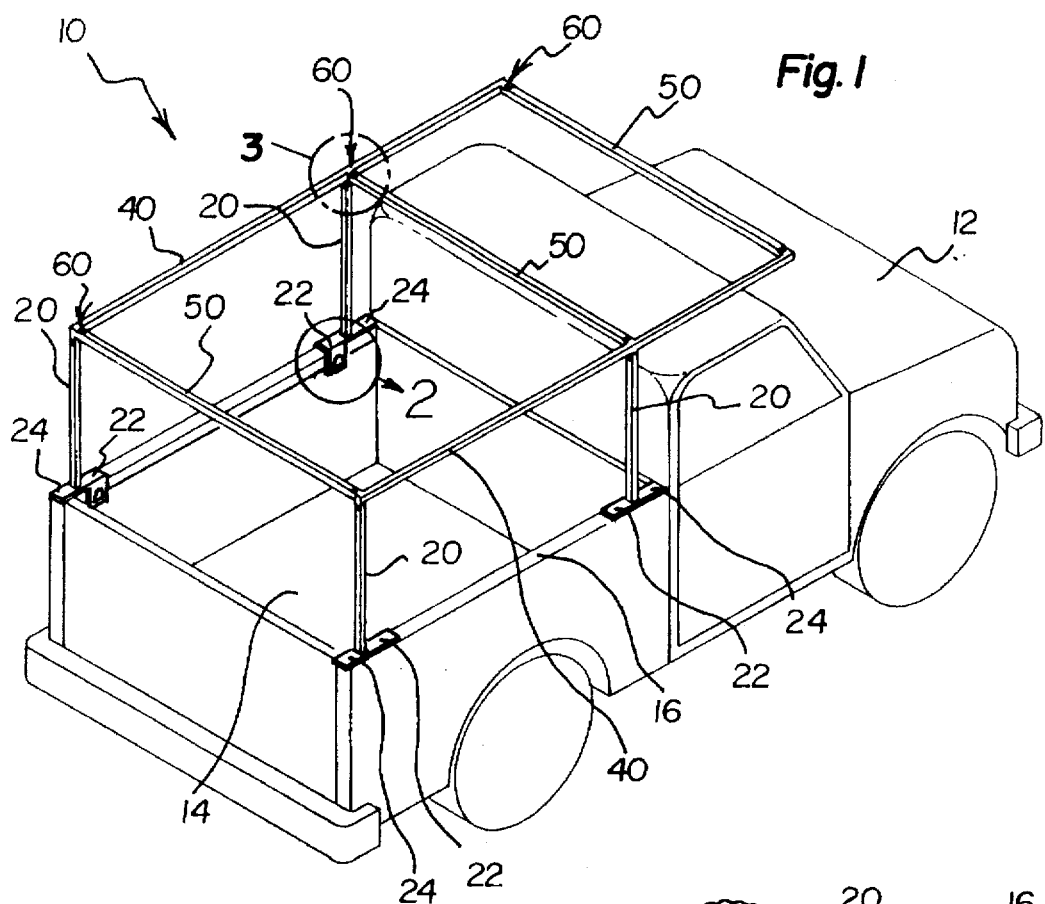
FIG. 1 is an upper side perspective view of a new Truck Bed Removable Rack System according to the present invention.

With reference now to the drawings, and in particular to FIGS. 1 through 6 thereof, a new Truck Bed Removable Rack System embodying the principles and concepts of the present invention and generally designated by the reference numeral 10 will be described.

More specifically, it will be noted that the Truck Bed Removable Rack System 10 comprises a plurality of vertical support poles 20 having a lower end and an upper end, wherein the lower end is formed for snugly engaging within a stake aperture 18 of an upper rim 16 of a bed 14 of a pick-up truck 12, a securing means 30 for securing the plurality of vertical support poles 20 within the stake aperture 18s without damaging the bed 14 of the pick-up truck 12, a pair of elongated members 40 removably attached to the upper ends of the plurality of vertical support poles 20 by a coupling means 60, wherein the pair of elongated members 40 are substantially parallel to one another, and a plurality of traverse members 50 having a first end and a second end, wherein the plurality of traverse members 50 are removably attached mesial the pair of elongated members 40 by the coupling means 60.

Figure 2:
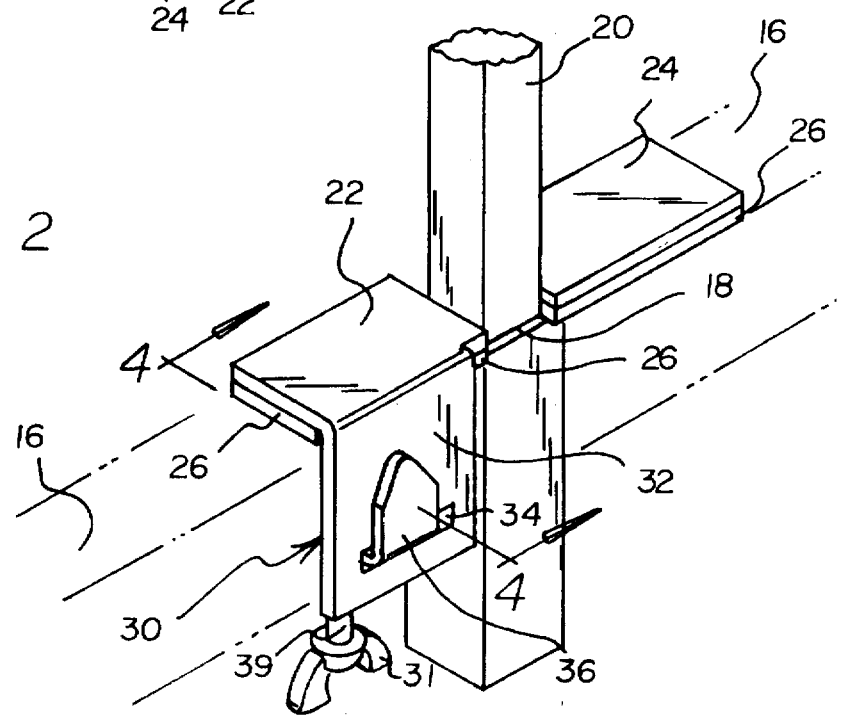
FIG. 2 is a magnified upper side perspective view from FIG. 2 of the securing means and a vertical support pole.
Figure 3:
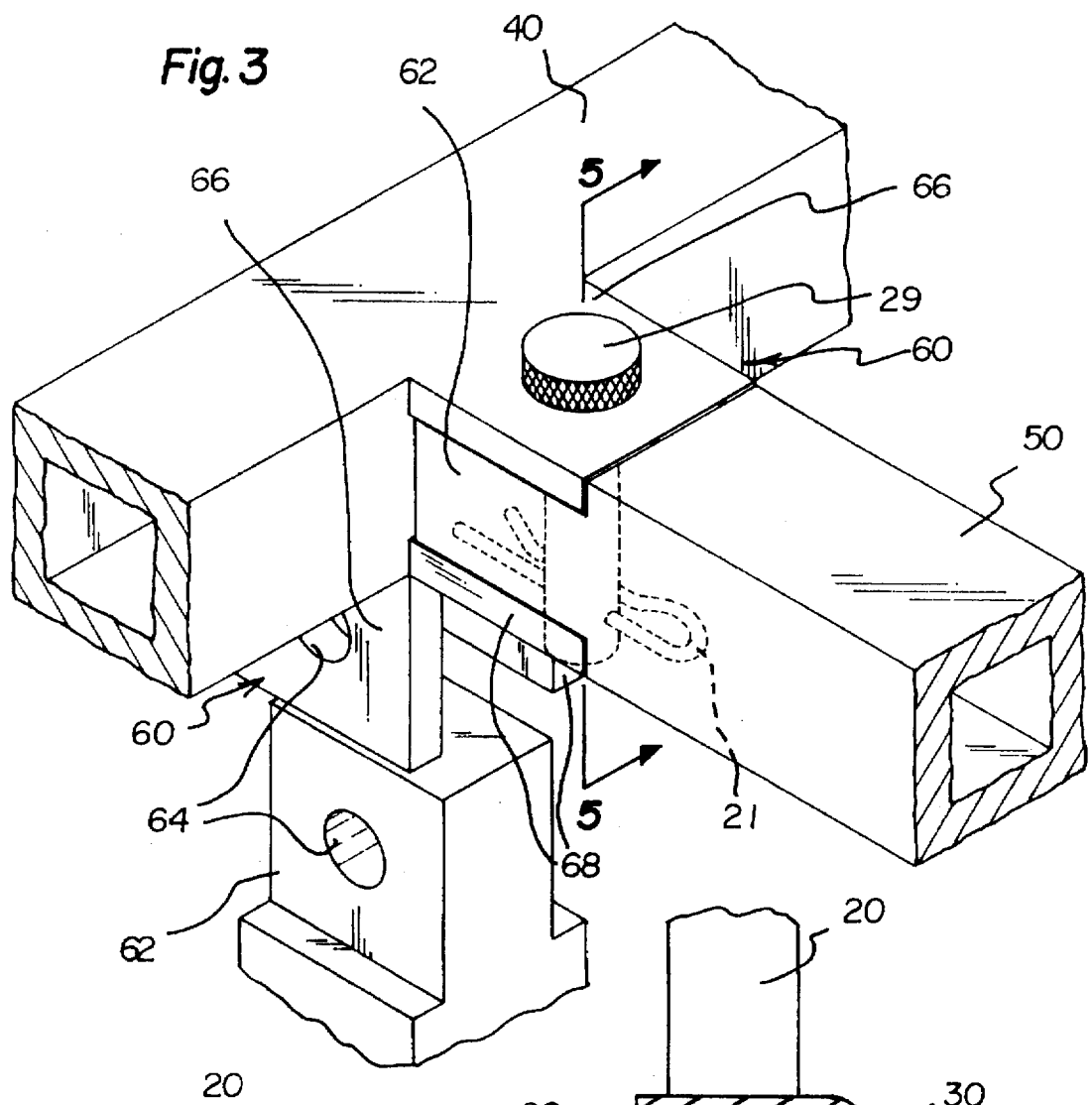
FIG. 3 is an exploded magnified upper side perspective view from FIG. 2 of the securing means, a vertical support pole and an elongated member.
Figure 6:
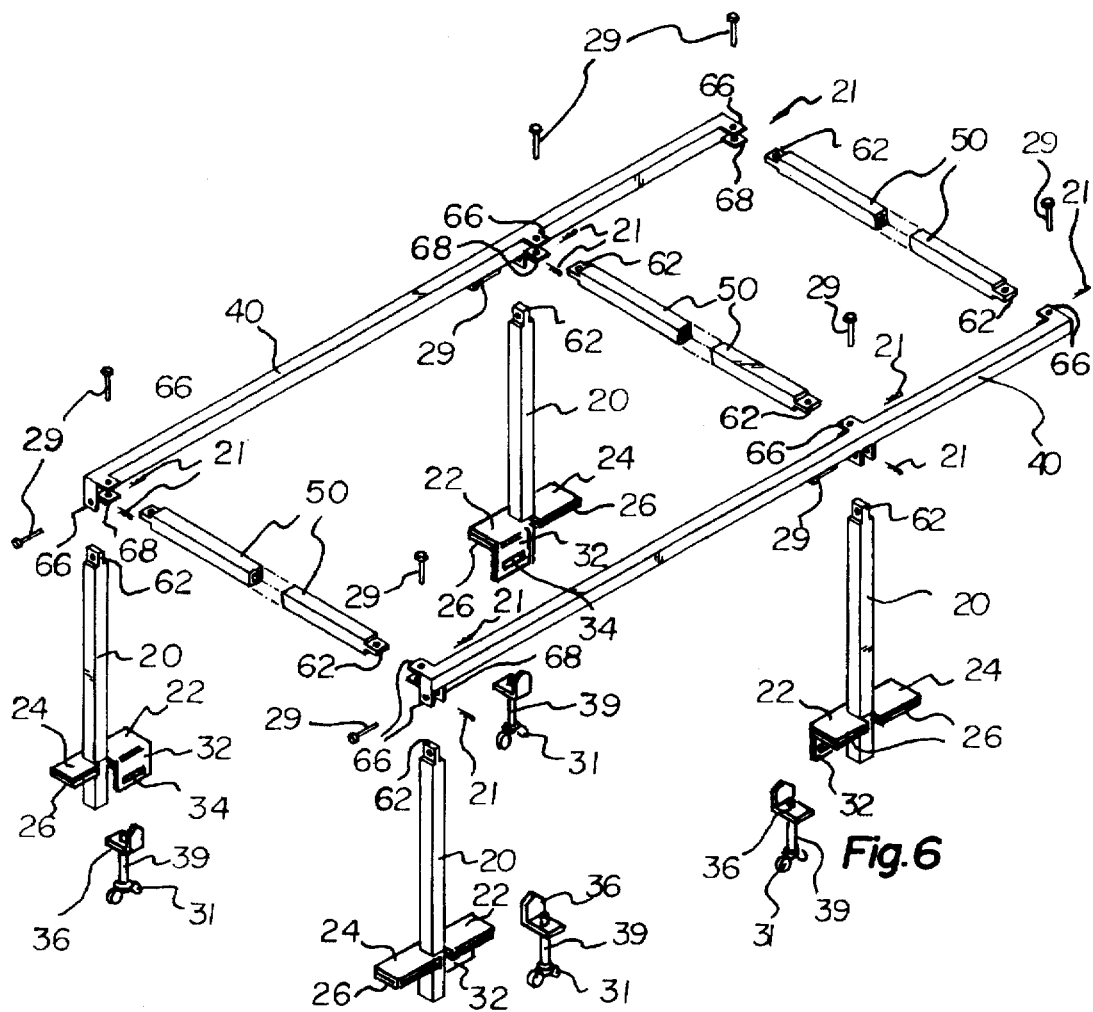
FIG. 6 is an exploded upper perspective view of the present invention.

As shown in FIGS. 1, 2 and 6 of the drawings, the vertical support poles 20 include an inner member 22 secured orthogonally to each of the vertical support poles 20 traversely to a longitudinal axis of the vertical support poles 20. The inner member 22 is removably juxtaposed to a top surface of the upper rim 16 for providing stability to the vertical support poles 20 and for vertically supporting the vertical support poles 20 as best shown in FIG. 1. An outer member 24 is secured orthogonally to each of the vertical support poles 20 traversely to the longitudinal axis of the vertical support poles 20 and opposite of the inner member 22. The outer member 24 is also removably juxtaposed to the top surface of the upper rim 16 for providing stability to the vertical support poles 20 and for vertically supporting the vertical support poles 20. A pair of rubber pads 26 are secured to a bottom surface of the inner member 22 and the outer member 24. The rubber pads 26 are juxtaposed to the top surface of the upper rim 16 thereby preventing scarring to the upper rim 16 by the inner member 22 and the outer member 24.

Figure 4:
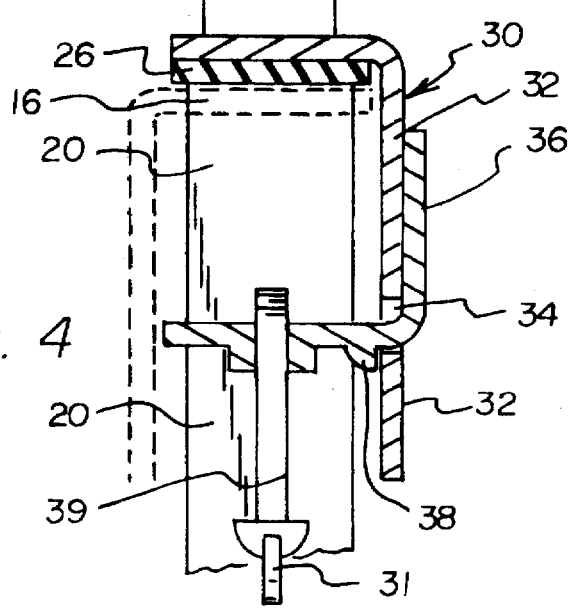
FIG. 4 is a cross sectional view taken along line 4—4 of FIG. 2.
Figure 5:
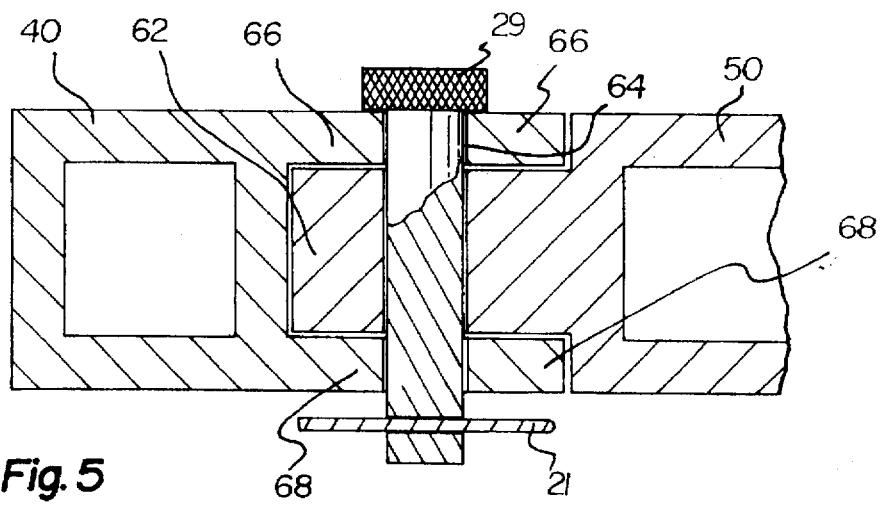
FIG. 5 is a cross sectional view taken along line 5—5 of FIG. 3.

As shown in FIGS. 1, 2, 4 and 6 of the drawings, the securing means 30 comprises an extended member 32 secured to the inner member 22 orthogonally projecting downward into an interior portion of the bed 14 of the pick-up truck 12. The extended member 32 includes a horizontal slot 34 near an end opposite of the inner member 22 as best shown in FIG. 2 of the drawings. An L-member 36 is provided having an elongated section and a traverse section as best shown in FIG. 4 of the drawings. The traverse section removably projects within the horizontal slot 34 as shown in FIG. 4 of the drawings. A ridge 38 is secured to the elongated section of the L-member 36 near the traverse section for engaging the extended member 32 when the traverse section is removably projecting within the horizontal slot 34. A threaded shaft 39 is also provided having a top end and a bottom end as best shown in FIG. 4 of the drawings. The threaded shaft 39 threadably engages the elongated section of the L-member 36 parallel to the traverse section. As shown in FIG. 4, the top end engages a bottom surface of the upper rim 16 for compressing the upper rim 16 mesial the top end of the threaded shaft 39 and the inner member 22. As shown in FIGS. 2, 4 and 6, the bottom end of the threaded shaft 39 includes a winged end 31 for allowing manual rotation of the threaded shaft 39 by a hand of a user.

As shown in FIGS. 1, 3, 5 and 6 of the drawings, the coupling means 60 includes a first member 66 and a second member 68 secured to the elongated member 40 adjacent and parallel to one another. A narrow member 62 is secured to each of the first end and the second end of the traverse members 50 as best shown in FIG. 6 of the drawings. Another narrow member 62 is secured to the upper end of the vertical support poles 20. The narrow member 62 is formed for snugly projecting mesially the first member 66 and the second member 68. An aperture 64 projects correspondingly through the first member 66, through the narrow member 62 and through the second member 68 for receiving a securing pin 29 for retaining the narrow member 62 mesially within the first member 66 and the second member 68. A clip in 21 projects through an end of the securing pin 29 for preventing accidental removal of the securing pin 29 from within the aperture 64.

In use, the plurality of vertical support poles 20 are positioned within the corresponding stake apertures 18 within the upper rim 16 of the bed 14. The elongated members 40 are secured to the upper end of the vertical support poles 20 parallel to one another. The traverse members 50 are then secured mesially the elongated members 40. The L-member 36 is inserted into the slot 34 within the extended member 32 until the ridge 38 is adjacent the extended member 32. The threaded shaft 39 is rotated so as to have the top end engage the bottom surface of the upper rim 16. The upper rim 16 is thereafter snugly compressed mesial the threaded shaft 39 and the rubber pads 26 thereby securing the vertical support poles 20 to the upper rim 16 without damage to the bed 14 of the pick-up truck 12. A plurality elongated objects to be transported may be positioned on top of the traverse members 50 and the elongated member 40 and accordingly secured to. The user transports the plurality of elongated objects to the desired location and unloads the elongated objects. When finished utilizing the present invention, the above procedure is reversed thereby allowing all of the components to be separated and stored within a convenient and compact storage area within the pick-up truck 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the pans of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Truck Bed Removable Rack System of comprising:
a plurality of vertical support poles having a lower end and an upper end, wherein said lower end is formed for snugly engaging within a stake aperture of an upper rim of a bed of a pick-up truck;
a securing means for securing said plurality of vertical support poles within said stake apertures without damaging said bed of said pick-up truck;
a pair of elongated members removably attached to said upper ends of said plurality of vertical support poles by a coupling means, wherein said pair of elongated members are substantially parallel to one another; and
a plurality of traverse members having a first end and a second end, wherein said plurality of traverse members are removably attached mesial said pair of elongated members by said coupling means;
wherein said vertical support poles include:
an inner member secured orthogonally to each of said vertical support poles transversely to a longitudinal axis of said vertical support poles, wherein inner member is removably juxtaposed to a top surface of said upper rim for providing stability to said vertical support poles and for vertically supporting said vertical support poles; and
an outer member secured orthogonally to each of said vertical support poles transversely to said longitudinal axis of said vertical support poles and opposite of said inner member, wherein said outer member is removably juxtaposed to said top surface of said upper rim for providing stability to said vertical support poles and for vertically supporting said vertical support poles.

2. The Truck Bed Removable Rack System of claim 1, wherein said securing means comprises:
an extended member secured to said inner member orthogonally projecting downward into an interior portion of said bed of said pick-up truck;
said extended member includes a horizontal slot near an end opposite of said inner member;
an L-member having an elongated section and a traverse section, wherein said traverse section removably projects within said horizontal slot;
a ridge secured to said elongated section of said L-member near said traverse section for engaging said extended member when said traverse section is removably projecting within said horizontal slot; and
a threaded shaft having a top end and a bottom end, wherein said threaded shaft threadably engages said elongated section of said L-member parallel to said traverse section wherein said top end is for engaging a bottom surface of said upper rim for compressing said upper rim mesial said top end of said threaded shaft and said inner member.

3. The Truck Bed Removable Rack System of claim 2, wherein said bottom end of said threaded shaft includes a winged end for allowing manual rotation of said threaded shaft by a hand of a user.

4. The Truck Bed Removable Rack System of claim 1, wherein said coupling means includes:
a first member and a second member secured to said elongated member adjacent and parallel to one another;
a narrow member secured to each of said first end and said second end of said traverse member and to said upper end of said vertical support pole, wherein said narrow member is formed for snugly projecting mesially said first member and said second member; and
an aperture projecting correspondingly through said first member, through said narrow member and through said second member for receiving a securing pin for retaining said narrow member mesially within said first member and said second member.

5. The Truck Bed Removable Rack System of claim 2, including a pair of rubber pads secured to a bottom surface of said inner member and said outer member for being juxtaposed to said top surface of said upper rim thereby preventing scarring to said upper rim.

* * * * *